Oct. 28, 1952  A. W. TONDREAU  2,615,364
METHOD OF OBTAINING REGISTRY BETWEEN SEPARATELY
PHOTOGRAPHED ACTION SCENES
Filed Jan. 30, 1950

ALBERT W. TONDREAU,
INVENTOR.

BY *Orl R. Gorham*

ATTORNEY

Patented Oct. 28, 1952

2,615,364

UNITED STATES PATENT OFFICE 2,615,364

METHOD OF OBTAINING REGISTRY BETWEEN SEPARATELY PHOTOGRAPHED ACTION SCENES

Albert W. Tondreau, Westwood Village, Calif., assignor to Warner Bros. Pictures, Inc., Burbank, Calif., a corporation of Delaware Application January 30, 1950, Serial No. 141,264

6 Claims. (Cl. 88—16)

This invention relates to the production of motion pictures, and particularly to a method of and system for obtaining registry and the desired perspective between separately photographed scenes or sequences, such as foreground and background components of a composite scene.

Process photography for motion pictures, wherein a foreground action may be taken in front of a screen and a background scene subsequently combined therewith, is well-known. Such a process is disclosed and claimed in my co-pending U. S. application, Ser. No. 142,616, filed February 6, 1950. For instance, a certain foreground action may be an actor walking within a room with a door, the script having the actor walk through the room and out the door into a certain outdoor scene, such as a beach along the seashore, which will be the background. In such instances, it has been found more economical to construct the room portion of the sequence, a sequence being considered in this description as a section of continuous action of a picture story, on a sound stage and photograph the actor as he approaches the beach; then, go to the beach and photograph the background of the sequence. Thus, when the room action is photographed, the scene through the door is a blank screen, in which the beach scene will eventually be provided. In photographing the background, the proper perspective between the actor and the background should be maintained, and the present invention permits any desired perspective or correlation to be obtained. The invention permits the actor's position in the foreground scene to be accurately aligned or placed in the background. That is, the background camera angle and the foreground camera angle can be adjusted to obtain a distance relationship between the foreground and background components.

This is accomplished by taking a particular frame of the mask or matte produced at the same time the foreground is photographed on the stage and placing it on the ground glass of the view finder of the camera photographing the background, and, when the camera is set up to photograph the background, the cameraman can exactly determine the perspective relationship between foreground and background. The camera can then be started, and, when the foreground and background components are combined, the desired perspective and alignment are obtained.

The principal object of the invention, therefore, is to facilitate the combining of foreground and background components taken at different times and in different locations.

Another object of the invention is to provide an improved method of and system for obtaining any desired perspective between foreground and background components of a composite picture photographed at different times and in different places.

A further object of the invention is to provide an improved photographing method and system for obtaining alignment between a foreground and a background component of a composite picture.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Figure 1:
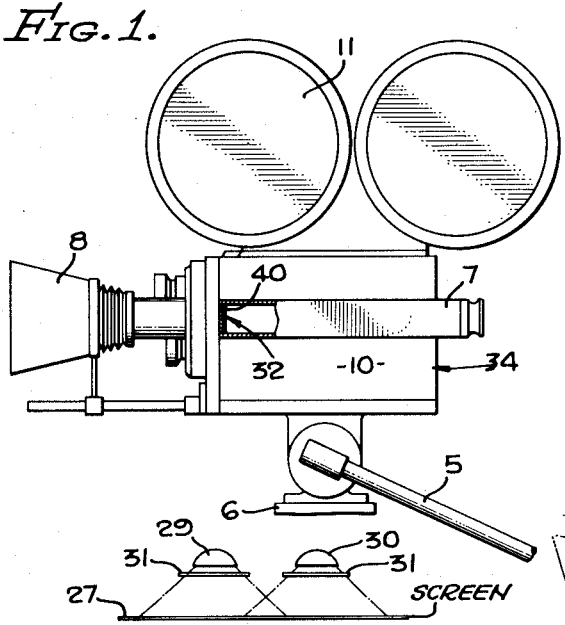
Fig. 1 is a side, elevational view of a motion picture camera used with the invention.

Referring now to Fig. 1, the usual type of motion picture camera 34 with a tilting and panning rod 5 is shown mounted on a base 6 and provided with a view finder 7, a lens shade 8, and the usual film advancing mechanism for advancing film fed from and to a magazine 11. The invention may be practiced with various types of cameras, the one shown in Fig. 1 being a general commercial type.

Figure 2:
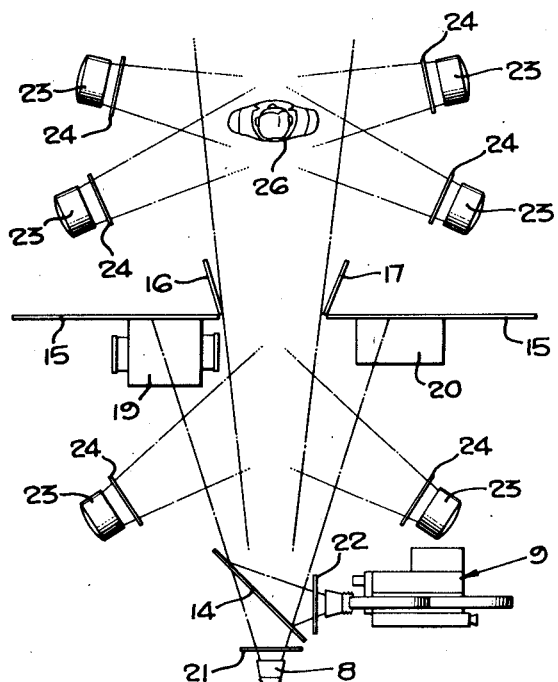
Fig. 2 is a diagrammatic, plan view of the method by which the foreground component of a scene is photographed.

To photograph the foreground portion of a sequence, and also to provide a mask therefor, a camera 4 is set up along with a camera 9, as shown in Fig. 2, the foreground shown being a room with one interior wall 15 having doors 16 and 17 which are shown open. Articles 19 and 20 may represent furniture positioned in the room. A beam splitter 14 divides the light between the cameras, while filters 21 and 22 separate the light spectrums impressed on the films in cameras 4 and 9. To obtain the proper light spectrum, lamps 23, in front of which are filters 24, illuminate the foreground with only visible light, which reaches the film in camera 4 to produce the positive image of the foreground.

The foreground may consist of an actor who moves about the interior of the room and then opens the doors 16 and 17 and walks away from the camera to some position, such as shown at 26. Positioned on the stage in the rear of the scene, as seen through the door, is a translucent screen 27, which is illuminated from behind with light substantially outside of the visible spectrum by lamps 29 and 30 having appropriate filters 31, only the light from the screen reaching the film in camera 9 to produce the mask film, one frame of which is shown at 32 in Fig. 4. The positive film from camera 4 will carry the foreground component which will be complete until the doors 16 and 17 are opened, after which the space between the actor 26 and the door frame will be opaque, since this portion in the negative from camera 4 was clear. The mask positive from camera 9, however, will have the portion between the actor and door frame clear and the remainder opaque, as shown by frame 32 in Fig. 4, this frame being selected from the portion of the mask when the doors 16 and 17 are open, and preferably, from the last few frames thereof.

Figure 4:
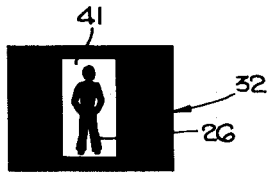
Fig. 4 is a frame of the mask produced by the method step shown in Fig. 2.

To obtain the background portion of the sequence between the actor 26 and the door, any camera, such as shown at 34, is moved to the appropriate location, which may be a seashore beach having a shore line 35, waves 36, and a boat 37. The frame 32 of the mask shown in Fig. 4 is now placed on the ground glass 40 of the view finder 7, shown in Fig. 1. The frame may be glued or otherwise attached to the glass. The cameraman now observes the scene 35—36—37 only through the clear portion 41 of frame 32 through his view finder. He, therefore places his camera with respect to the background scene, so that the scene appears at the proper distance with respect to the foreground. For instance, if the room is supposed to be close to the shore line 35, and the boat is to be seen through the door at a certain distance, the cameraman can accurately position his camera 34 at the proper location by observing the proper portions of the background objects with respect to the foreground object or actor, as he appears on the mask, through the clear portion 41. By then photographing the background component, with or without the actor, the camera angle will be correct when the background component is combined with the foreground component, as disclosed and claimed in my co-pending application mentioned above.

Figure 3:
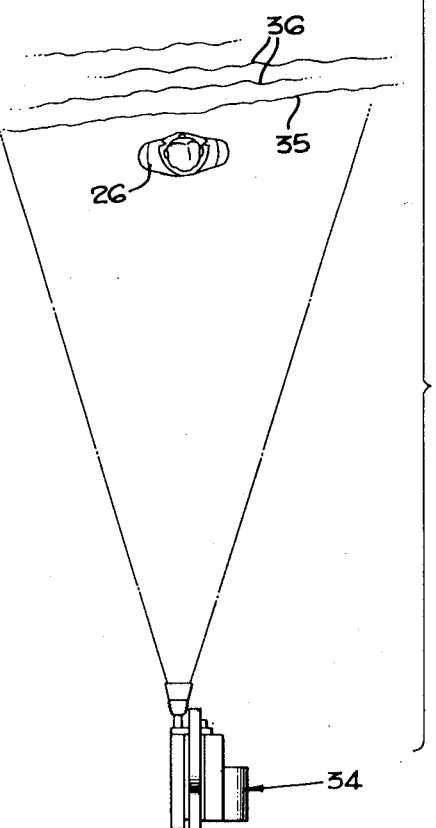
Fig. 3 is a diagrammatic view of the method by which the background component of the scene is photographed.

Although the invention has been described with the actor going away from the camera in Figs. 2 and 3, the sequence may also be photographed in the reverse order if called for by the script, one of the first frames of the foreground component then being used on the ground glass. Although the invention has been described for use in obtaining the proper perspective between foreground and background components of composite pictures, it can be used to register an actor in the proper position where a continuation of the indoor sequence is at a different location and it is desired to place the actor in his last position at the end of the indoor sequence. In this case, the last frame of the indoor sequence is attached to the ground glass and the actor is positioned to correspond or register with his picture and the action then continued.

I claim:

1. The method of obtaining exact registry between two portions of a motion picture sequence, comprising photographing a portion of the action of a sequence with a background, processing said film strip to provide an outline of said action on the frames of said film strip, placing a frame from the terminal end of said film strip on the view finder of a camera for photographing the remainder of said sequence, aligning the action of said first portion with its outline thereof on said frame on said view finder, and continuing the photographing of the remainder of said sequence.

2. The method of aligning the action at the end of a photographed portion of a sequence with the same action at the beginning of the next portion of a sequence when said portions are photographed at different times, comprising photographing the first portion of a sequence, processing the exposed film strip used in said photographing, placing a frame from the terminal end of said film strip on the view finder of a camera for photographing the other portion of said sequence, aligning the action of said first portion with the outline of said action on said frame on said view finder to determine the starting position of the action in the remaining portion of said sequence, and photographing the remaining portion of said sequence.

3. The method of obtaining a certain perspective between the action of a sequence and a background component of one portion of said sequence photographed at different times, comprising photographing the action, developing the film strip on which said action was photographed, placing a frame from the terminal end of said developed film strip on the view finder of a camera for photographing said action of said sequence with a background component, said action appearing in outline on a transparent area in which said background is to appear, aligning the action of said sequence with the outline of said action on the frame on said view finder with respect to said background component to be photographed, and photographing said action with its new background component.

4. The method of obtaining the correct relationship between the action component with different background components in the same sequence of a composite photograph, one of said background components being taken at a different time from the other, comprising photographing the action component with one background component, developing the film strip used in said photographing in which said action appears as an outline on an area to be occupied by another background component, placing a frame at the terminal end of said film strip on the view finder of a camera for photographing said action component with said other background component, adjusting said action component to coincide with the outline thereof on said frame, and photographing said action and said other background component.

5. The method of determining coincidence between a foreground component to be photographed with a plurality of background components, one of said background components to be photographed at a different time from the other, comprising photographing said foreground component with one background component which forms one portion of a picture sequence, processing the film strip used in said photographing, the area for said other background being of uniform density, placing a frame at the terminal end of said film strip on the view finder of a camera for photographing said foreground component with another background component, aligning said foreground component with its outline on said frame, and photographing said foreground component with said other background component.

6. The method in accordance with claim 5, in which said foreground component is action in said sequence, the outlines of said action being on said frame of film, and said frame being positioned on the ground glass of said view finder.

ALBERT W. TONDREAU.

REFERENCES CITED

The following references are of record in the file of this patent:

UNITED STATES PATENTS

| Number | Name | Date |
|---|---|---|
| 1,356,868 | Leonard | Oct. 26, 1920 |
| 1,819,844 | Ross | Aug. 18, 1931 |
| 1,860,737 | Handschiegl | May 31, 1932 |
| 1,982,211 | Gillette | Nov. 27, 1934 |
| 2,024,081 | Williams | Dec. 10, 1935 |
| 2,164,770 | Gregory | July 4, 1939 |
| 2,173,518 | Jackman | Sept. 19, 1939 |
| 2,375,477 | Hynd | May 8, 1945 |
| 2,487,773 | Schwartz et al. | Nov. 8, 1949 |

FOREIGN PATENTS

| Number | Country | Date |
|---|---|---|
| 21,086 | Great Britain | of 1911 |
| 397,969 | Great Britain | Sept. 7, 1933 |